(12) United States Patent
Mercz et al.

(10) Patent No.: US 7,743,816 B2
(45) Date of Patent: Jun. 29, 2010

(54) SWITCHABLE WASTE GAS EXCHANGER

(75) Inventors: József Mercz, Schwäbisch Gmünd (DE); András Szabó, Budapest (HU); Gyula Tóth, Budapest (HU)

(73) Assignee: BEHR GmbH & Co. KG, Stuttgart (DE)

( * ) Notice: Subject to any disclaimer, the term of this patent is extended or adjusted under 35 U.S.C. 154(b) by 1110 days.

(21) Appl. No.: 10/514,230

(22) PCT Filed: May 13, 2003

(86) PCT No.: PCT/EP03/04958

§ 371 (c)(1),
(2), (4) Date: Feb. 15, 2005

(87) PCT Pub. No.: WO03/098026

PCT Pub. Date: Nov. 27, 2003

(65) Prior Publication Data

US 2005/0199381 A1    Sep. 15, 2005

(30) Foreign Application Priority Data

May 15, 2002 (HU) .................. 0200144 U
Jul. 26, 2002 (DE) .................. 102 34 187

(51) Int. Cl.
*B60H 1/00* (2006.01)
*F28F 27/00* (2006.01)
*G05D 23/00* (2006.01)

(52) U.S. Cl. .................. 165/11.1; 165/51; 165/96; 165/297

(58) Field of Classification Search .................. 165/11.1, 165/296, 297, 298, 299, 51, 96, 100
See application file for complete search history.

(56) References Cited

U.S. PATENT DOCUMENTS

| 4,403,590 | A | * | 9/1983 | Davis | 165/51 |
| 5,477,676 | A | * | 12/1995 | Benson et al. | 165/96 |
| 6,213,105 | B1 | | 4/2001 | Banzhaf et al. | |
| 6,253,837 | B1 | * | 7/2001 | Seiler et al. | 165/297 |
| 6,330,910 | B1 | * | 12/2001 | Bennett | 165/297 |
| 6,981,545 | B2 | * | 1/2006 | Damson et al. | 165/297 |
| 6,997,143 | B2 | * | 2/2006 | Piccirilli et al. | 165/297 |
| 7,073,576 | B2 | * | 7/2006 | Peirasso | 165/297 |
| 7,353,865 | B2 | * | 4/2008 | Speer | 165/51 |
| 2001/0020363 | A1 | | 9/2001 | Strahle et al. | |

FOREIGN PATENT DOCUMENTS

| DE | 297 22 813 U1 | 6/1999 |
| DE | 198 12 702 A1 * | 9/1999 |
| DE | 100 25 877 A1 * | 12/2001 |
| EP | 0 987 427 A1 * | 3/2000 |
| EP | 1 030 050 A1 * | 8/2000 |
| FR | 2 827 011 A1 | 1/2003 |
| JP | 59-027372 U | 2/1984 |
| JP | 62-007943 A | 1/1987 |
| JP | 63-088212 A | 4/1988 |
| JP | 3006943 A | 11/1994 |
| JP | 10-002256 A | 1/1998 |
| JP | 10-205334 A | 8/1998 |
| JP | 11-200955 A | 7/1999 |
| JP | 2001-304049 A | 10/2001 |

* cited by examiner

*Primary Examiner*—Ljiljana (Lil) V Ciric
(74) *Attorney, Agent, or Firm*—Foley & Lardner LLP

(57) ABSTRACT

A switchable waste gas heat exchanger which can be arranged and used in exhaust gas recirculation lines in internal combustion engines, such as in motor vehicles.

37 Claims, 9 Drawing Sheets

SWITCHABLE WASTE GAS EXCHANGER

The present invention relates to switchable exhaust gas heat exchangers. Switchable exhaust gas heat exchangers which form the basis of the precharacterizing clause, are known, for example, from EP 1 030 050 A1. They are used in particular in exhaust gas recirculation lines of internal combustion engines, and specifically in exhaust gas recirculation lines of internal combustion engines of motor vehicles.

It is known in internal combustion engines to recirculate discharged exhaust gas to the fresh air intake side. The recirculation of exhaust gas in internal combustion engines serves to condition the exhaust gas. To optimize pollutant emissions and fuel consumption in the internal combustion engine, it may be expedient if exhaust gas discharged from the internal combustion engine is recirculated again to its air intake side. In this context, there are operating states, such as the cold start, in which it is particularly expedient for the exhaust gas temperature of the exhaust gas to be as high as possible, since this results, for example, in rapid internal heating of the internal combustion engine. In other operating states, it is preferable for the temperature of the recirculated exhaust gas to be reduced as much as possible, for example in order to achieve a greater density of the volumetric flow of the recirculated exhaust gas.

In this context it is known, for example from the document which forms the basis of the precharacterizing clause, to provide a switchable exhaust gas heat exchanger in the exhaust gas recirculation line, in which exhaust gas passed through the heat exchanger can be cooled or left uncooled as desired.

With a switchable exhaust gas heat exchanger forming the basis of the precharacterizing clause of this type, exhaust gas flows from an exhaust gas feed line through the switchable exhaust gas heat exchanger to an exhaust gas discharge. This creates the possibility of routing the exhaust gas which flows in at the exhaust gas feed line either through a first exhaust gas passage, in which there is arranged a heat exchanger through which coolant flows, or through a second exhaust gas passage, which bypasses the heat exchanger, to an exhaust gas discharge. There is a switching valve which switches the exhaust gas stream between the exhaust gas passages.

It is an object of the invention to simplify the structure and control of an exhaust gas heat exchanger of this type.

According to the invention, working on the basis of an exhaust gas heat exchanger of the generic type, this object is achieved by an exhaust gas heat exchanger in accordance with the independent claims.

A switchable exhaust gas heat exchanger according to the invention has an exhaust gas feed line and an exhaust gas discharge for an exhaust gas stream. A first exhaust gas passage and a second exhaust gas passage and a switching valve for switching the exhaust gas stream between the exhaust gas passages are provided. A heat exchanger, through which a coolant flows, is arranged in the first exhaust gas passage for cooling the exhaust gas stream flowing through it. The second exhaust gas passage bypasses the heat exchanger, leading directly to the exhaust gas discharge of the exhaust gas heat exchanger. According to the invention, the switching valve is switched as a function of the temperature of the coolant of the internal combustion engine, the coolant of the heat exchanger in particular also being the engine coolant.

The switching as a function of the temperature of the engine coolant allows the switching valve to be switched in a simple way as a function of the temperature of the internal combustion engine.

According to an advantageous configuration of the invention, for this purpose there is a thermostat, the coolant flowing around the thermostat. The thermostat produces, preferably directly, the adjustment movement for the switching valve. For this purpose, it may in particular be provided that a thermostat adjuster executes a linear, axial displacement. Furthermore, according to an advantageous configuration the thermostat is arranged in the coolant circuit downstream of the heat exchanger of the first exhaust gas passage. The displacement of the thermostat adjuster is to be selected in accordance with the switching travel of the valve adjuster required to switch the switching valve. The thermostat adjuster must be able to perform an actuation of the switching valve which covers the entire range between the two actuation limit positions. This may in particular be achieved with a displacement of the thermostat adjuster which is in a range of the order of magnitude of 8 to 16 mm, preferably around 12 mm.

The flow of the coolant around the thermostat advantageously makes it possible to dispense with a measuring device for measuring the cooling water temperature and a control device with an adjuster actuated by external force. This represents a simple and particularly inexpensive design which also has few possible sources of faults and therefore a low scrap rate even in long-term operation. The design is advantageously designed in particular in such a way that the coolant flows around the thermostat.

The switching of the switching valve by the thermostat may advantageously take place counter to the action of a restoring spring. In this context, configurations of the invention provide for the spring force applied by the restoring spring to be in the range from at least 40 N up to 50 N. The spring force is to be determined in such a way that the thermostat can apply an actuating force, counter to the action of the restoring spring, which is able to actuate the switching valve all the way into the actuation limit position, while on the other hand the prestress of the spring must be sufficient to ensure return to the actuation starting position.

According to a further configuration of the invention, there is flow through the valve head, which is fluid-separated from the chamber region, through which the exhaust gas stream flows, of the switching valve, in order for the valve head to be cooled. This cooling is advantageous because it means that the entire valve housing, which is preferably made from a metallic material, is exposed to a reduced thermal loading. Furthermore, modules and components arranged in the region of the valve head are also protected from thermal damage; this applies in particular to control units and adjusters arranged in the region of the valve head. In particular if the switching valve is actuated by a separate, for example pneumatic, adjuster with a reduced-pressure means, protection against overheating, including through radiant heat, is advantageous. A particularly expedient embodiment of liquid cooling of the valve head is achieved if the coolant of the heat exchanger also flows through the switching valve. In this context, the switching valve is located in particular downstream of the heat exchanger in the coolant circuit.

One expedient configuration of a switching valve is achieved if the switching valve has a valve housing in which a disk valve is arranged as adjustment element, the disk valve comprising a valve disk and a valve stem protruding from it. The thermostat acts directly on the valve stem. The valve stem is used to transmit the resulting actuation, while the valve disk is used to cover and open up flow paths in the valve housing. To prevent deposits of particulates in the movement space of the valve housing covered by the valve adjuster, the valve disk may have machined, in particular ground, edges. Burn-off of particulates which have been deposited on the valve disk can be promoted by the valve disk and if appropriate also regions of the valve stem which are exposed to the exhaust gas stream having a catalytic coating which promotes burn-off of the particulates by reducing the spontaneous ignition temperature required for this burn-off.

A further advantageous configuration relates to the arrangement of the thermostat with respect to the switchable exhaust gas heat exchanger or with respect to the valve housing. A particularly compact and inexpensive design is achieved if the thermostat is arranged in a cap which simultaneously also has the outlet opening for the coolant. The cap in particular also serves to close off the coolant-carrying portion of the valve housing. This is advantageous in particular if cooling liquid flows through the valve head region. With a view to use in different installation positions and installation conditions in different vehicles, the switchable exhaust gas heat exchanger is particularly variable if the cap is held rotatably with respect to the housing. It is then possible, by rotating the cap with respect to the valve housing, to change the direction of the outlet opening of the cooling liquid in any desired way and thereby to match it to different conditions without other components having to be used.

One configuration of the invention provides for the switching valve to be designed as what is known as a rocker valve which optionally adopts one of two possible switching positions. Either the first exhaust gas passage is fluid-connected to the exhaust gas feed line and at the same time the second exhaust gas passage is fluid-separated from the exhaust gas feed line, or vice versa. The rocker valve is in this way switched by corresponding actuation of the valve adjuster as a function of the temperature of the coolant.

Another configuration of the invention provides for the switching valve to be designed as a proportional control valve over a certain switching range. This configuration makes it possible for in each case a partial stream to be passed through the second exhaust gas passage and the first exhaust gas passage. This means that the change when the switching valve is switched is not sudden but rather continuous.

According to a preferred configuration of both a rocker valve and a proportional control valve, the exhaust gas stream flows through the second exhaust gas passage for as long as the temperature of the engine coolant is below a switching threshold. The switching threshold may in particular be determined empirically with regard to the exhaust gas conditioning, the exhaust gas consumption and further operating parameters of the internal combustion engine. The experimental determination may be carried out in particular on engine test benches. Values for the switching threshold are in particular in the range between the cold start temperature and the desired operating temperature of the engine coolant. In the case of a rocker valve, with a configuration of this nature exhaust gas only flows through the first exhaust gas passage above the switching threshold. In the case of a proportional control valve, above the switching threshold the proportion of the exhaust gas part-stream flowing through the first exhaust gas passage increases as the temperature of the engine coolant rises further.

Furthermore, in the case of a proportional control valve, it is necessary to determine a switching limit at which the actuation limit position is reached, and above this switching limit the entire exhaust gas stream flows through the first exhaust gas passage and is therefore cooled in the heat exchanger. The switching limit is preferably also determined empirically, in particular on the engine test bench, taking account of suitable optimization criteria. The switching limit may in particular be approximately 10° C. above the switching threshold.

By using a suitable configuration of the valve adjuster, it is possible not only to switch between the exhaust gas passages but also to regulate the flow of exhaust gas through the exhaust gas heat exchanger, which eliminates the need for a separate control valve. For this purpose, the valve adjuster must additionally be able to cover partial areas of the exhaust gas recirculation line and therefore to limit or even reduce to zero the volumetric flow passing through by reducing or completely covering the available inflow surface area. This can be achieved in particular by suitable selection of the thickness of the valve disk beyond the circumference of the valve disk. As a result, under certain circumstances the simultaneous functionality as a proportional control valve may be restricted.

A further switchable exhaust gas heat exchanger according to the invention has an exhaust gas feed line and an exhaust gas discharge for an exhaust gas stream. A first and a second exhaust gas passage and a switching valve for switching the exhaust gas stream between the exhaust gas passages are provided. A heat exchanger, through which a coolant flows, is arranged in the first exhaust gas passage for the purpose of cooling the exhaust gas stream flowing through it. The second exhaust gas passage bypasses the heat exchanger, leading directly to the exhaust gas discharge from the exhaust gas heat exchanger. According to the invention, the two exhaust gas passages are arranged in a common housing and are separated from one another by an air gap.

This configuration of a switchable exhaust gas heat exchanger has the advantage of a compact, virtually encapsulated design. A simple, inexpensive form of fitting with few connection locations and at the same time good protection for the components against damage is ensured. In particular, a structural unit of this type is particularly simple to deliver and fit to the engine block or in the engine compartment of the internal combustion engine or the corresponding vehicle.

According to an advantageous configuration of a switchable exhaust gas heat exchanger of this type, the second exhaust gas passage is formed from an inner tube which is only attached on one side. The exhaust gas stream flows through the interior cavity of the inner tube. The inner tube is in particular attached directly to the valve housing of the switching valve. A particularly durable way of attaching it is by welding, in which case the weld seam is preferably designed to be fluid-tight, so that there is no need for further sealing means in this region, which is also subject to high thermal loading on account of the exhaust gas stream flowing through it. However, in addition to welding it is also possible to use other joining processes, such as soldering, etc. The other free end of the inner tube projects towards the exhaust gas discharge. The fact that the inner tube projects freely allows thermal expansion thereof during heating without mechanical stresses being produced. This measure ensures that the inner tube is very durable without the risk of cracks forming in the wall of the inner tube as a result of the thermal loading. In this context, it should be noted that the thermal loading on the second exhaust gas passage is significantly higher than the thermal loading on the first exhaust gas passage, since there is no cooling of the exhaust gas stream flowing through it.

The inner tube is advantageously supported with respect to surrounding components by means of at least one outer supporting element. This ensures that there is an air gap between the inner tube and surrounding components and that the inner tube is thermally isolated from the other components by the air gap.

It is preferable for a supporting element to be arranged in the last third, preferably the last quarter, of the exhaust gas passage before the free end. However, they may also be arranged in other ways. Surrounding components are in particular the first exhaust gas passage and the housing of the switchable exhaust gas heat exchanger. To minimize the conduction of heat from the inner tube via the supporting element to other components, the number of supporting elements is selected to be as low as possible. In particular, just one supporting element is provided. Furthermore, the contact surface area, i.e. the thickness of the material of the supporting element, between supporting element and inner tube or between supporting element and other components, is kept as small as possible. A suitable selection of material for the supporting element can also prevent the supporting element from becoming a major heat bridge.

The at least one outer supporting element may in particular be an encircling or partially supporting frame which surrounds the inner tube. The supporting frame is in particular attached on just one side, i.e. either on the inner tube or on one or more other components, but not on both simultaneously. This measure also serves to allow thermal expansion in particular of the inner tube, primarily in the axial direction thereof, with respect to other components, such as with respect to the housing.

According to an advantageous configuration, the supporting frame is attached by welding to the outer side of the inner tube. It is preferable for the welding not to be carried out in the form of a continuous, uninterrupted weld seam. There is no need for the welded joint to be made fluid-tight, since this portion is not exposed to the exhaust gas stream. In particular, the welding takes place only over a partial length of the contact line between inner tube and supporting frame.

According to a preferred configuration of switchable exhaust gas heat exchangers according to the invention, a fluid-tight housing is provided, in which the first exhaust gas passage and the second exhaust gas passage are arranged. An exhaust gas collector space, which leads to the exhaust gas discharge, is formed in the housing. The two exhaust gas passages open out into the exhaust gas collector space. This design on the one hand forms a transition, which is simple to fit, from the two exhaust gas passages to the common exhaust gas discharge, and on the other hand this exhaust gas collector space also results in a certain decoupling of the two exhaust gas passages from elements located downstream of the exhaust gas heat exchanger in the exhaust pipe. In this context, it is advantageous in particular if the two exhaust gas passages are of the same length.

It will be understood that the features described above and yet to be explained below can be employed not only in the combination indicated in each case but also in other combinations or on their own without departing from the scope of the present invention. Further advantageous configurations of the invention are also to be found in the claims.

The invention is explained on the basis of the exemplary embodiments shown in the drawing and is described in more detail below with reference to the drawing, in which.

FIGS. 1 to 3 and FIGS. 4 to 6 illustrate sectional illustrations of two embodiments of switchable exhaust gas heat exchangers according to the invention. In the first embodiment, a switching valve with axial displacement of the valve adjuster, which is actuated by means of a thermostat arranged in the head of the valve adjuster, is used. In the second embodiment, the valve adjuster of the switching valve is actuated by axial rotation about its center axis, with an actuating element that is actuated by external force, in the form of a reduced-pressure means, being used to actuate the valve adjuster. Of course, it is also quite possible to provide a valve adjuster with axial displacement in combination with an actuating element of the switching element actuated by external force or a valve adjuster which can rotate about an axis and is actuated by a thermostat.

Figure 1:
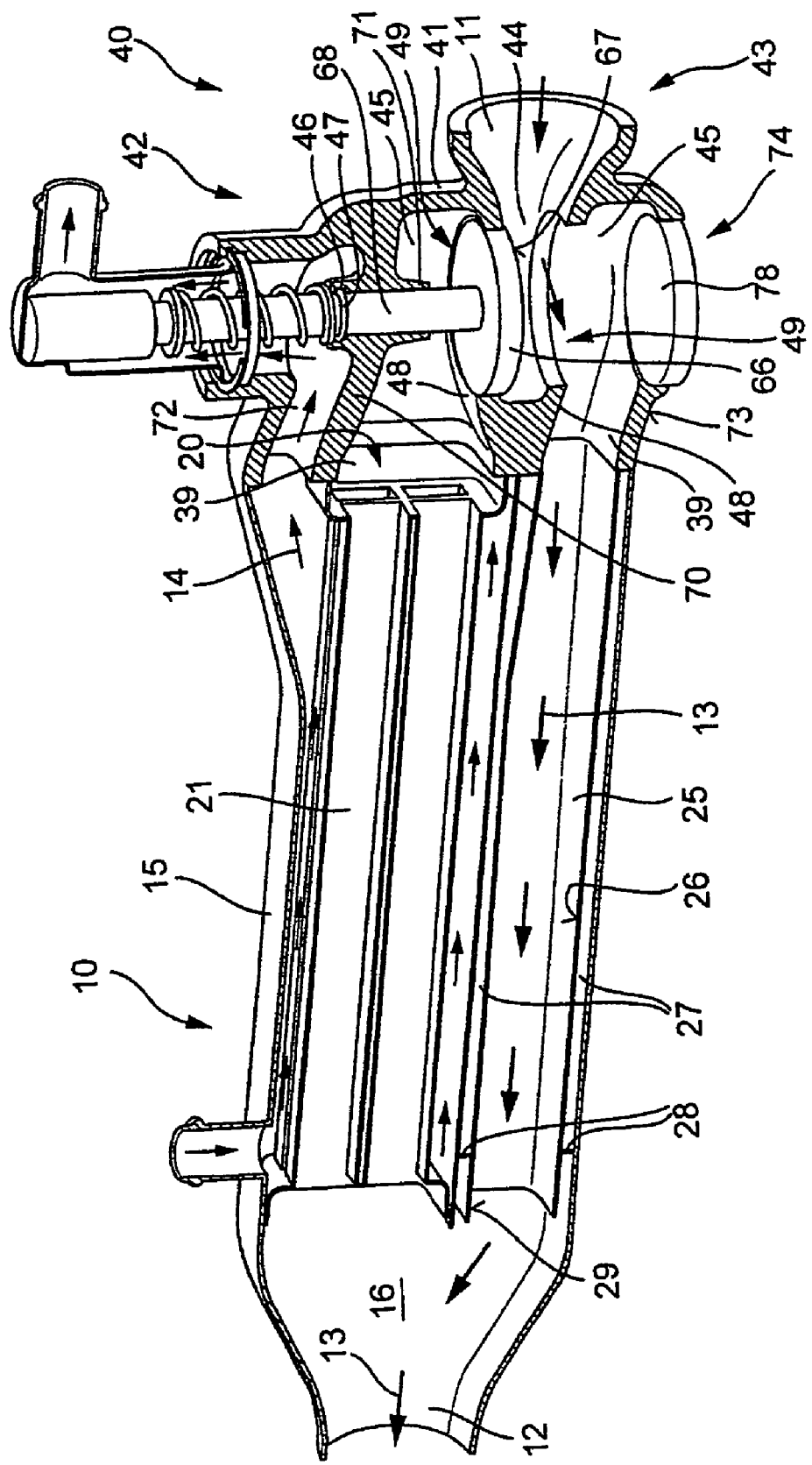
FIGS. 1 and 2 show partially sectional illustrations of a first embodiment of a switchable exhaust gas heat exchanger according to the invention in two different switching positions.
Figure 2:
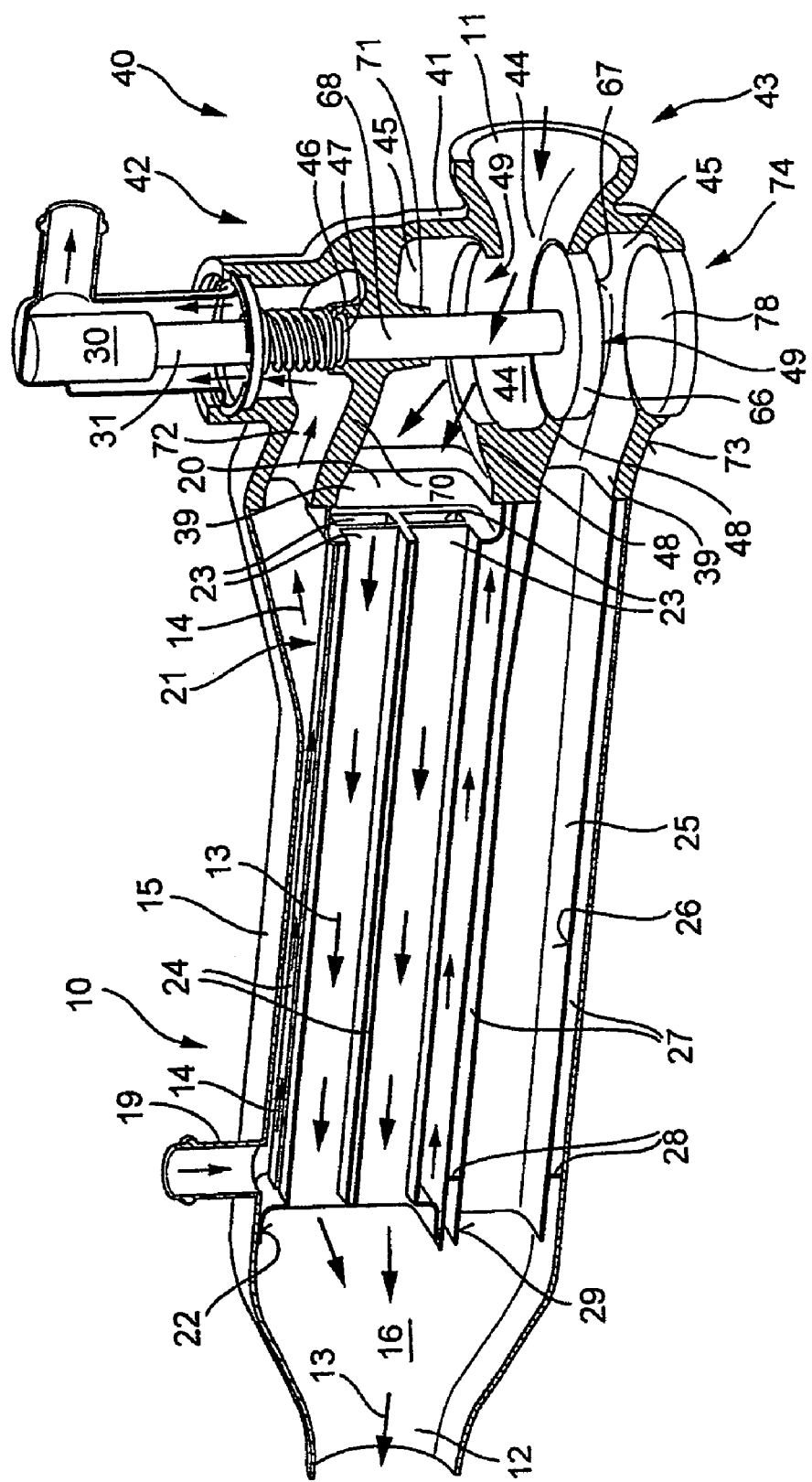
Figure 3:
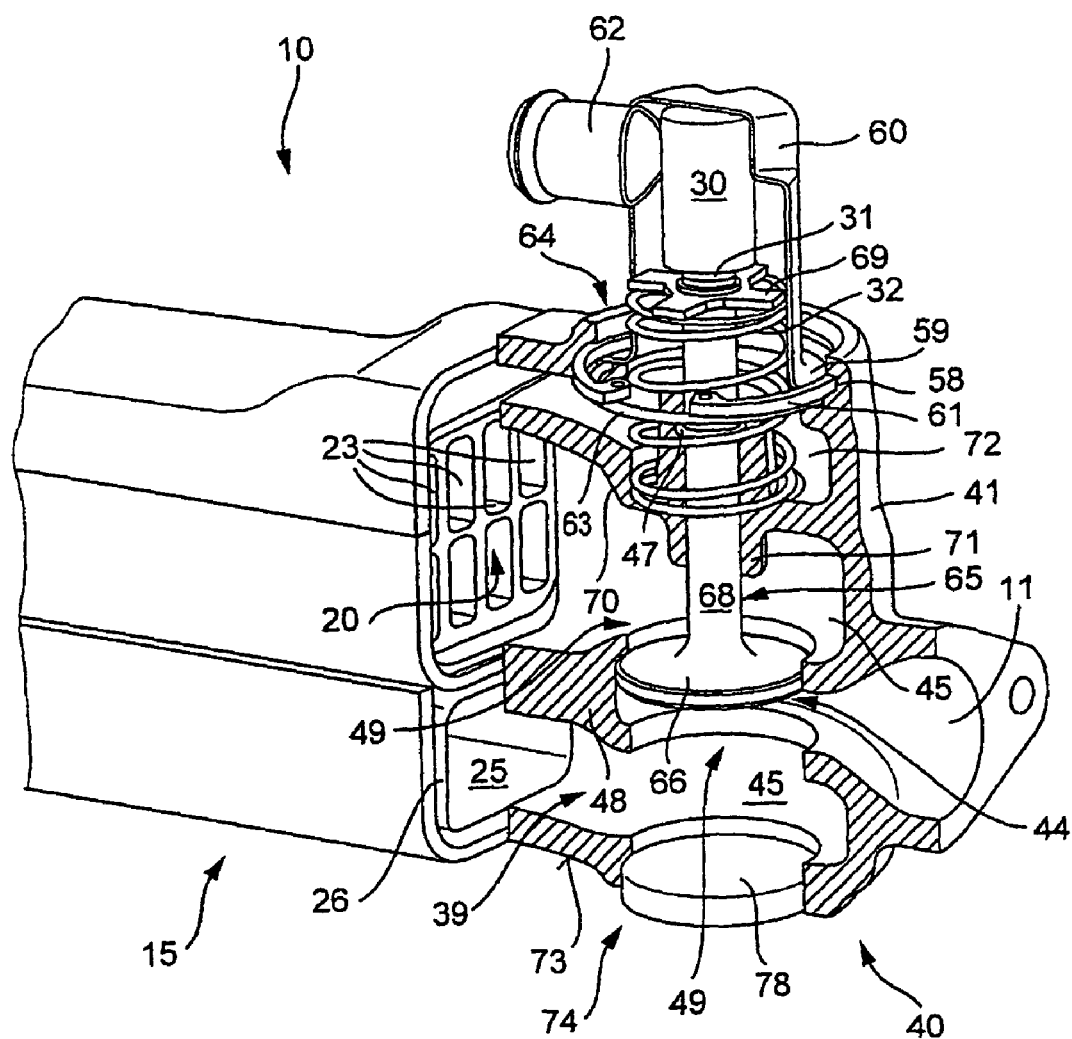
FIG. 3 shows an enlarged, partially sectional illustration of the first embodiment in the region of the switching valve.
Figure 4:
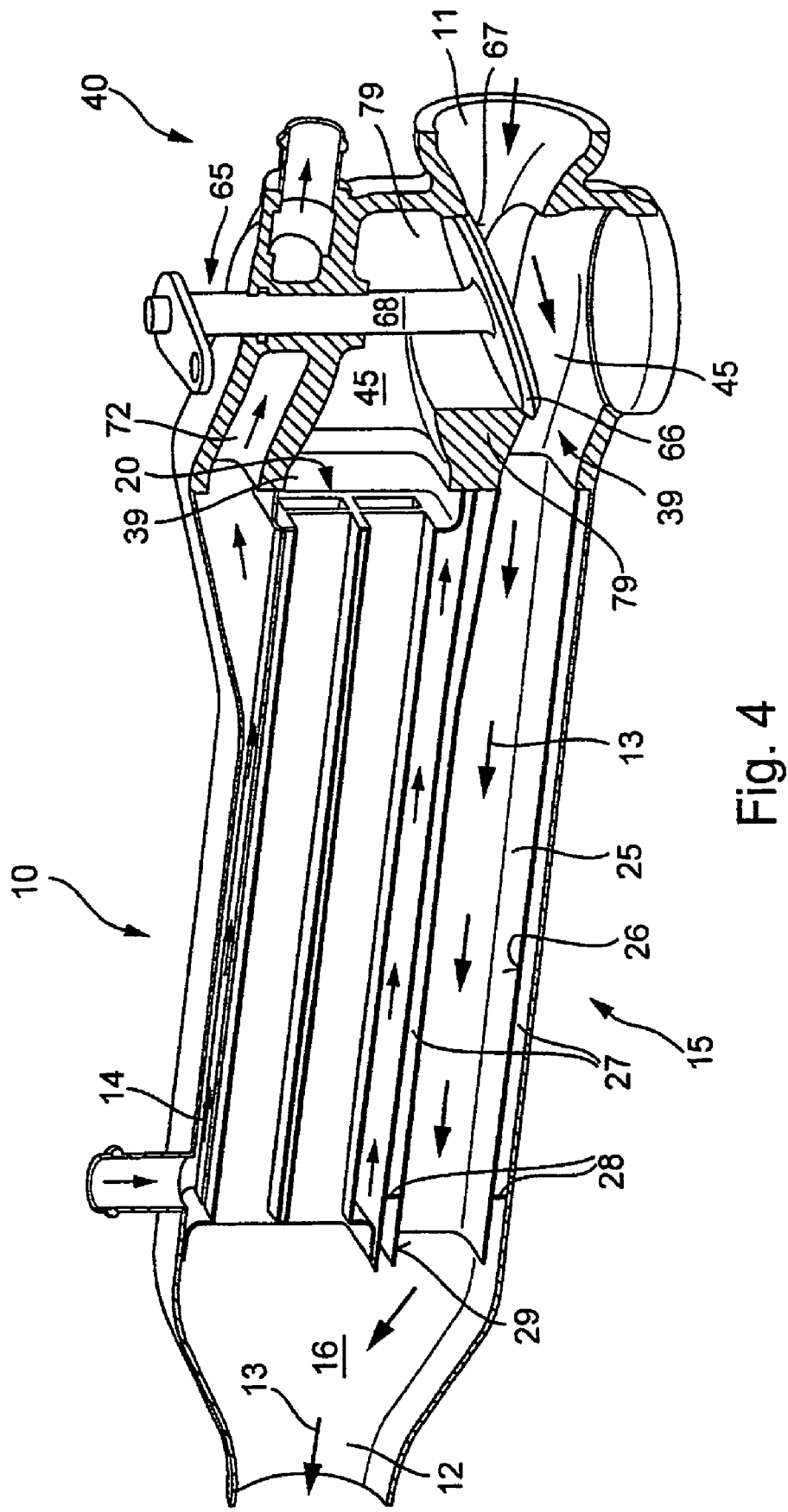
FIGS. 4 and 5 show partially sectional illustrations of a second embodiment of a switchable exhaust gas heat exchanger according to the invention in two different switching positions.

If the switching valve is a rocker valve, FIGS. 1 and 2 and FIGS. 3 and 4 show the switching positions of the rocker valve, in which case FIG. 1 and FIG. 3 in each case illustrate the switching position in which the exhaust gas stream is flowing exclusively through the second exhaust gas passage, whereas FIG. 2 and FIG. 4 in each case illustrate the switching position in which the exhaust gas stream is flowing exclusively through the first exhaust gas passage. If the switching valve is a proportional control valve, FIGS. 1 and 3 in each case illustrate the actuation starting position and FIGS. 2 and 4 in each case illustrate the actuation limit positions of the proportional control valve. An intermediate position of the proportional control valve, in which in each case a partial stream of the exhaust gas stream flows through the first exhaust gas passage and the second exhaust gas passage, has not been illustrated.

FIGS. 1 and 3 show, in a partially sectional illustration, a first embodiment of a switchable exhaust gas heat exchanger 10. The exhaust gas heat exchanger has a housing 15 which directly adjoins a switching valve 40.

The exhaust gas feed line 11 opens out into the valve housing 41 of the switching valve 40. In the interior of the switching valve 40, the exhaust gas stream illustrated by arrows 13 first of all passes into the middle chamber 44. The middle chamber 44 is in each case separated from the two outer chambers 45 by means of a respective partition 48, the partitions 48 each having a through-flow opening 49. In the exemplary embodiment illustrated, the three chambers 44, 45 are arranged vertically above one another; the upper of the two outer chambers 45 opens out in the first exhaust gas passage 20, and the lower of the two outer chambers 45 opens out in the second exhaust gas passage 25. The through-flow openings 49 are aligned with one another. The valve chamber region 43 formed by the three chambers 44, 45 is separated from the valve head region 42 above the upper of the two outer chambers 45 by the intermediate wall 70. A guide tube 71, which passes through the intermediate wall 70 and above the intermediate wall 70 opens out into a water chamber 72 which is formed in the valve head and has the coolant 14 flowing through it, is formed at the intermediate wall 70, coaxially with respect to the through-flow openings 49.

The valve stem 68 of a disk valve 65, guided by the guide tube 71, projects into the middle chamber 44. An annular groove 46, in which a seal 47 is arranged, is formed in the guide tube 71. The annular groove 46 is arranged in that part of the guide tube 71 which is surrounded by the water chamber 72 and is therefore cooled by the coolant. The seal 47 in the annular groove 46 separates the water chamber 72 in a fluid-tight manner from the upper outer chamber 45, and it is impossible for either exhaust gases to flow into the water chamber 72 or for coolant to pass from the water chamber 72 into the chambers 44, 45 of the valve chamber region 43 of the switching valve 40. The radial play of the valve stem 68 in the guide tube 71 is selected to be as low as possible, but the valve stem 68 must be reliably prevented from becoming jammed in the guide tube 71.

The valve disk 66 of the disk valve 65 is suitable for closing off the through-flow openings 49 in the partitions 48 for the exhaust gas stream in a fluid-tight manner. For this purpose, the valve disk 66 may have ground edges 67 which cover the edge of the through-flow openings 49 in such a way that deposits of particulates in this region are scraped off. In particular, the valve disk 66 has an external diameter which corresponds to the clear width of the through-flow openings 49. The valve disk 66 can therefore penetrate into the through-flow openings 49 and thereby close off the flow path formed by the respective through-flow opening 49. An insertion opening 74 which allows the disk valve 65 to be introduced into the valve housing 41 is formed on the underside 73 of the valve housing 41. After the disk valve 65 has been introduced, the insertion opening 74 is closed off by a closure 78.

When the disk valve 65 is in the actuating starting position illustrated in FIG. 1, the through-flow opening 49 between the middle chamber 44 and the outer chamber 45 which opens out into the first exhaust gas passage 20 is closed. Consequently, the exhaust gas stream, which is indicated by the arrows 13, flows into the second exhaust gas passage 25. The second exhaust gas passage 25 is delimited by the inner tube 26, which is welded in a fluid-tight manner to the valve housing 41, so that the opening 39 of the outer chamber 45 in the valve housing 41 into the inner tube 26 is surrounded in a fluid-tight manner. The inner tube 26 projects freely into the interior of the housing 15, and its free end 29 opens out in the exhaust gas collector space 16. In the vicinity of the free end 29, the inner tube 16 is supported with respect to the housing 15 and with respect to the first exhaust gas passage 20 by means of the supporting frame 28, which is attached to the inner tube 16 so as to surround it on all sides, in such a way that an air gap 27 which thermally insulates the inner tube from its surroundings is present on all sides. The inner tube 16 and therefore the second exhaust gas passage 25 has a rectangular cross section, and the rectangular cross-sectional shape may also be provided in the case of the first exhaust gas passage, and consequently the housing 15 may also be rectangular in cross section. The rectangular cross-sectional shape allows a compact, space-saving design. From the exhaust gas collector space 16, the exhaust gas stream then flows onward into the exhaust gas discharge 12 of the switchable exhaust gas heat exchanger 10 and from there onward, in the case of exhaust gas recirculation in an internal combustion engine, to the fresh air intake section of the internal combustion engine.

When the disk valve 65 is in the actuating limit position illustrated in FIG. 2, the through-flow opening 49 between the middle chamber 44 and the outer chamber 45, which opens out into the second exhaust gas passage 25, is closed. Therefore, the exhaust gas stream illustrated by the arrows 13 flows into the first exhaust gas passage 20. The actuation travel between the actuation starting position and the actuation limit position is an axial displacement which in particular is in the range from 8 to 16 mm and, for example, amounts to around 12 mm. The axial displacement required is substantially determined by the dimensions of the middle chamber 44. The heat exchanger 21, which is a countercurrent heat exchanger, is arranged in the first exhaust gas passage 20. The exhaust gases flow through the exhaust gas heat exchanger through the gas passages 23 which are in each case adjacent to or surrounded by water passages 24 through which coolant flows. The flow of coolant, which is represented by the arrows 14, leads, in the opposite direction to the flow of exhaust gas illustrated by the arrows 13, from the water connection piece 19 of the heat exchanger 21 to the water chamber 72 in the valve head 42. The exhaust gas stream is cooled as the coolant flows through the heat exchanger 21.

The heat exchanger 21 and therefore the first exhaust gas passage 20 ends with the exhaust gas passage end 22; the first exhaust gas passage 20 is of the same length as the second exhaust gas passage 25. The first exhaust gas passage 20 also opens out in the exhaust gas collector space 16. The exhaust gas stream which has been cooled in the first exhaust gas passage 20 leaves the switchable exhaust gas heat exchanger 10 through the exhaust gas discharge 12.

The stream of coolant originating from the heat exchanger 21 and represented by the arrows 14 is introduced into the water chamber 72 of the valve head 42, where it cools the valve housing 41 and in particular the guide tube 71 with the seal 47 arranged in the annular groove 46. This measure protects the switching valve 40 per se from thermal overheating. The stream of coolant flows through the valve head 42 irrespective of whether or not the exhaust gas stream is flowing through the first exhaust gas passage 20. The valve head opening 64, which is once again coaxial with the through-flow openings 49 and the guide tube 71, is formed in the valve head. The valve head opening 64 is closed off by the cap 60, on which the water outlet connection piece 62 through which the cooling liquid leaves the switchable exhaust gas heat exchanger 10 and flows back into the remainder of the cooling circuit of the internal combustion engine, is formed integrally. The switchable exhaust gas heat exchanger is in particular arranged downstream, immediately after the engine block of the internal combustion engine, in the coolant circuit.

The valve stem 68 of the disk valve 65 projects through the guide tube 71 and into the water chamber 72. In the region of the water chamber 72, the valve stem is in contact with the coolant and is thereby cooled. The restoring spring 32 is arranged in the water chamber 72, concentrically with respect to the valve stem 68. This restoring spring is on one side supported on the intermediate wall 70 and on the other side is supported on a carrier 69 attached to the valve stem 68, it being possible for the restoring spring 32 and carrier 69 to be introduced through the valve head opening. The restoring spring 32 holds the disk valve 65 in the actuating starting position shown in FIG. 1 and FIG. 3. Actuation of the disk valve 65 counteracts a restoring force which is at least in the range from 40 to 50 N.

The cap 60 closes off the valve head opening 64 in a fluid-tight manner. For this purpose, in particular a sealing ring 63 is arranged between cap 60 and valve head opening 64. Furthermore, the cap 60 is held rotatably on the valve housing 41. For this purpose, a radially protruding annular edge 59 engages behind an attachment groove 58 formed on the valve housing side.

The cap 60 is then attached in the attachment groove 58 by being secured by means of a circlip 61 which likewise engages in the attachment groove 58. This creates a durable, fluid-tight connection between valve housing 41 and cap 60, which on the other hand allows the cap to pivot and therefore allows the water outlet connection piece which projects radially from the cap 60 to be oriented in a variable way.

The thermostat 30 is arranged in the interior of the cap. By means of the thermostat adjuster 31, the thermostat 30 actuates the disk valve 65. The thermostat adjuster 31 executes the valve displacement, required for actuation of the disk valve 65, with respect to the housing of the thermostat 30 held in the cap 65 as a function of the temperature of the coolant in the cooling circuit. This axial valve displacement is transmitted directly to the valve adjuster, the disk valve 65 of the switching valve 40, since the thermostat adjuster 31 acts on the valve stem 68.

Figure 5:
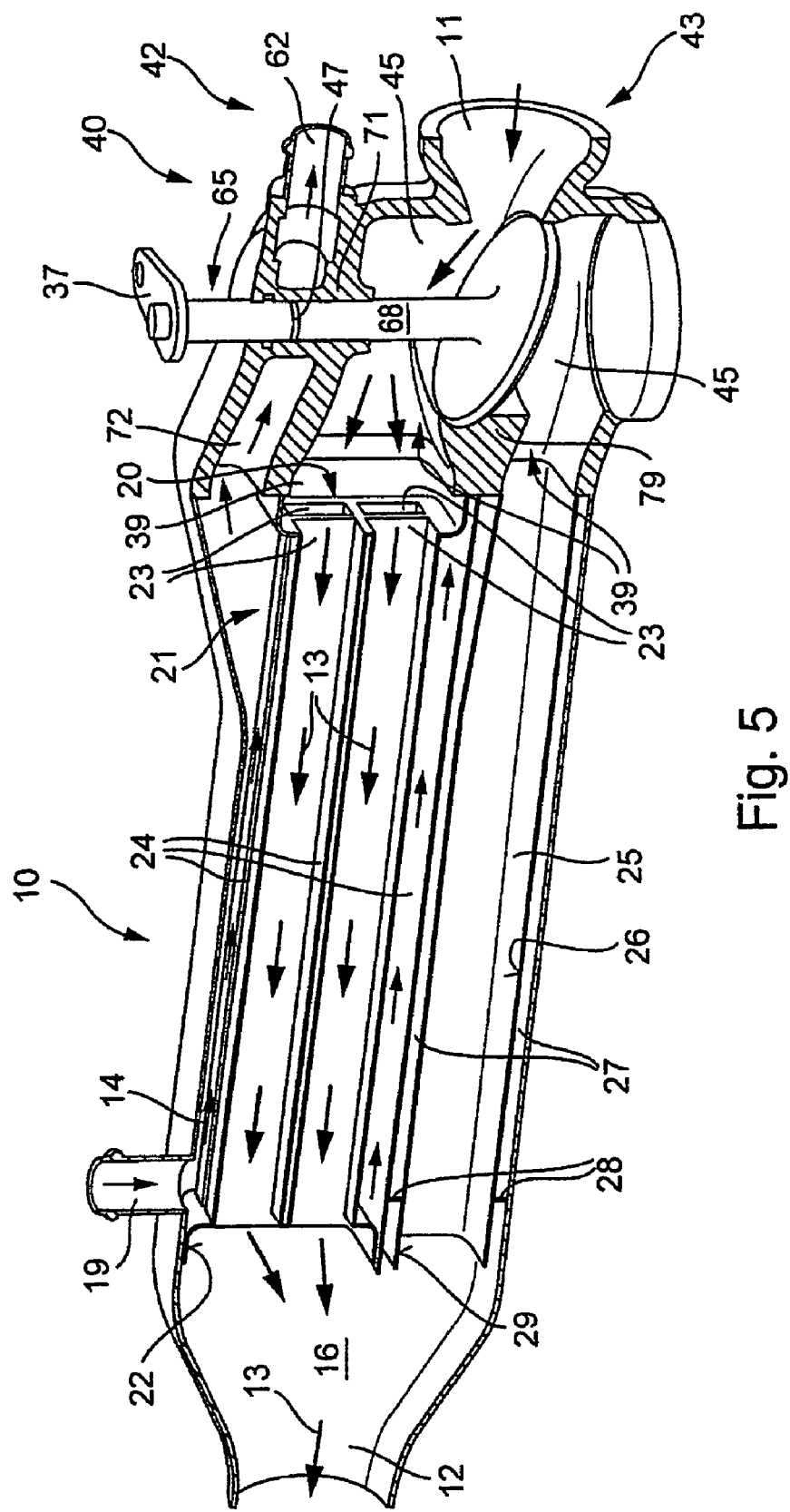
Figure 6:
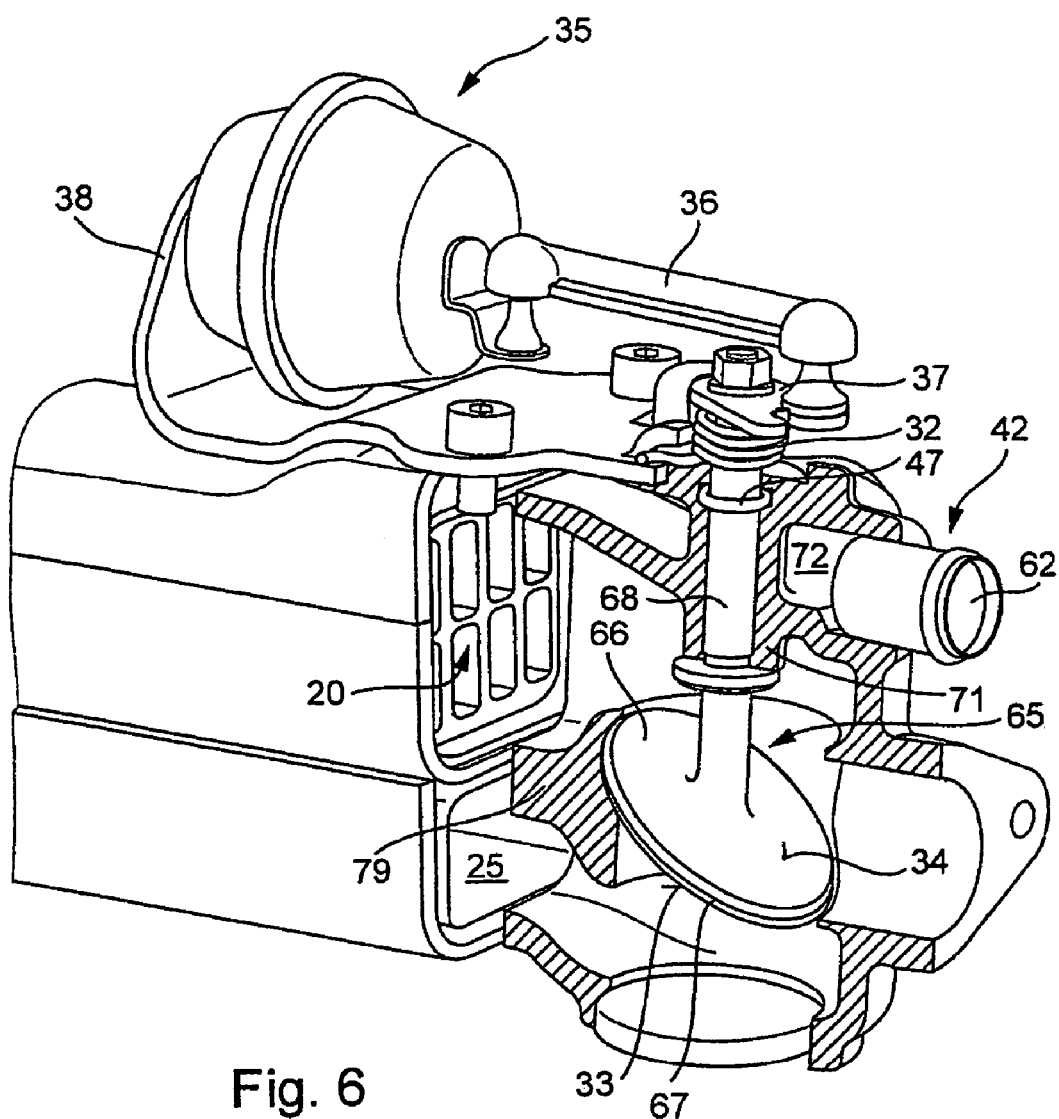
FIG. 6 shows an enlarged, partially sectional illustration of the further embodiment in the region of the switching valve.

FIGS. 4 to 6 differ from the configuration illustrated in FIGS. 1 to 3 only with regard to the design of the switching valve 40 and its actuation. For details as to the rest of the design, reference should be made to the description of FIGS. 1 to 3.

The switching valve 40 in accordance with FIGS. 4 to 6, and in particular FIG. 6, has a valve adjuster which is actuated by rotation instead of a valve adjuster which executes an axial displacement. For this purpose, a valve disk 66 which is inclined at an angle other than 90° with respect to the valve stem 68 is provided. The valve disk is guided in a switching ring 79 which replaces the middle chamber 44, the ground edge 67 of the valve disk 66 bearing in a sealing manner against a correspondingly curved, barrel-shaped bulge and covering the latter when the disk valve 65 rotates. Depending on the rotational position of the valve disk 66, the exhaust gas stream coming through the exhaust gas feed line 11 flows onto the top side 34, from which the valve stem 68 projects, or the underside 33 of the valve disk 66. The switching ring 79 is delimited at the top and bottom by the through-flow openings 49 which open out into the outer chambers 45.

FIG. 4 illustrates the situation in which the exhaust gas stream flows onto the underside 33. On account of the fact that the ground edge 66 is bearing against the switching ring, the flow path to the first exhaust gas passage 20 is blocked by the valve disk. The exhaust gas stream, as illustrated by the arrows 13, flows into the second exhaust gas passage 25. FIGS. 5 and 6 show the opposite situation, in which the top side 34 of the valve disk 66 faces the feed line 11. The flow path to the second exhaust gas passage 25 is now blocked and the exhaust gas stream is routed through the first exhaust gas passage 20.

In intermediate positions of the valve, in each case a partial flow of the exhaust gas stream flows onto the top side 34 and the underside 33 and is accordingly passed into the first and second exhaust gas passages 20 and 25, respectively. The proportion of the exhaust gas stream which flows through the first exhaust gas passage 20 is in this context dependent on the angular position of the disk valve 65 with respect to the exhaust gas feed line 11. The embodiment with the rotary valve is particularly suitable for use in conjunction with a continuous adjustment of the exhaust gas stream between the two exhaust gas passages 20, 25. The pivot angle of the disk valve 65 from the actuating starting position, which is illustrated in FIG. 4, until the actuating limit position, illustrated in FIG. 6, is reached, amounts to 180°, although it is possible for the pivot angle ranges between 0° and 30° and between 150° and 180° to route an exhaust gas stream only through the second exhaust gas passage or the first exhaust gas passage, respectively, so that these positions correspond to the actuating starting position or the actuating limit position. This is dependent on the design of the width of the exhaust gas feed line 11 at the valve housing 41.

The valve stem 68 of the disk valve 65 is routed out of the upper of the two outer chambers 45 through a guide tube 71, the guide tube 72 passing through a water chamber 72, through which the coolant flows, in the valve head 42. A seal 47, which prevents an auxiliary flow of exhaust gas through the guide tube 71, is arranged in the guide tube 71 in the region of the water chamber 72 or above it. Outlet openings 62 may be arranged on three sides of the water chamber 72; of these outlet openings, two are closed and one is used to return the coolant into the coolant circuit of the internal combustion engine.

The holding bracket 38 is articulatedly mounted on the outside of the valve housing 41. The reduced-pressure means 35 is secured to the holding bracket 38. Via a push rod 36 and the pivot lever 37 which projects laterally from the valve stem 68, the reduced-pressure means actuates the disk valve 65 and pivots the latter about the valve stem 68, counter to the action of the restoring spring 32. Actuation of the reduced-pressure means adjusts the switching valve 40; this actuation can take place as a function of the temperature of the engine coolant.

FIGS. 7 to 12 show various parts of a process for producing a corresponding exhaust gas heat exchanger 10.

Figure 7:
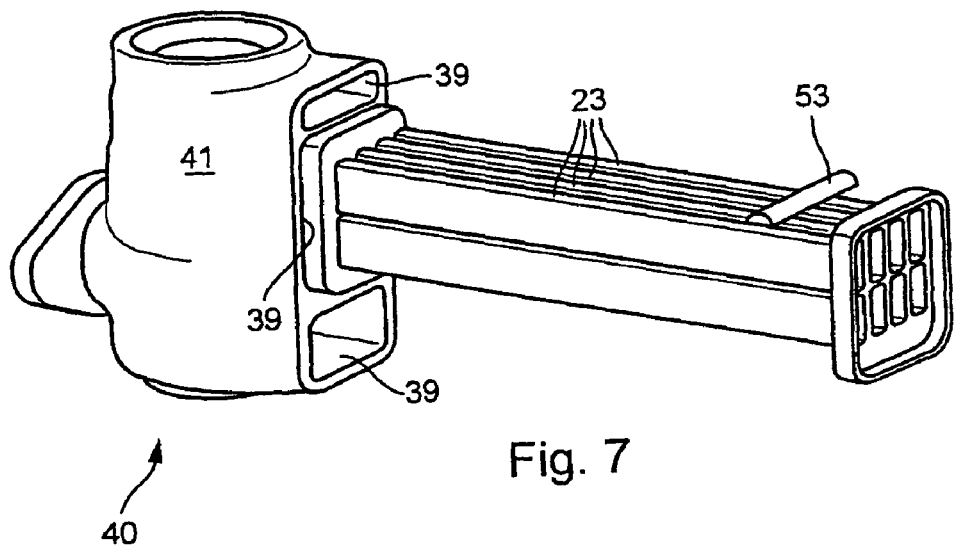
FIGS. 7 to 12 show perspective views of the structure of a switchable exhaust gas heat exchanger according to the invention during various assembly steps.

In accordance with step 1 of the process, illustrated in FIG. 7, the inner body of the heat exchanger 21 is welded in a fluid-tight manner to the valve housing 41 in the region of the opening 39 in the valve housing 41 for the first exhaust gas passage 20. The inner body includes the gas passages 23, which are arranged on a common frame, passed through the heat exchanger, are formed from tubes and run parallel to one another. A metal diverter plate 53, which ensures that the flow of coolant does not just flow over the heat exchanger, but rather flows uniformly around the gas passages, is arranged at the top side of the gas passages.

Figure 8:
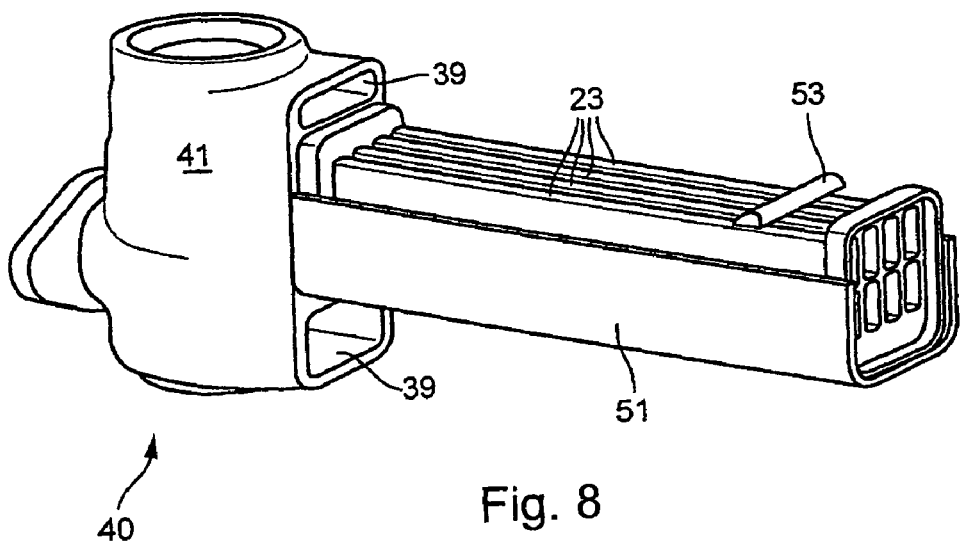
Figure 9:
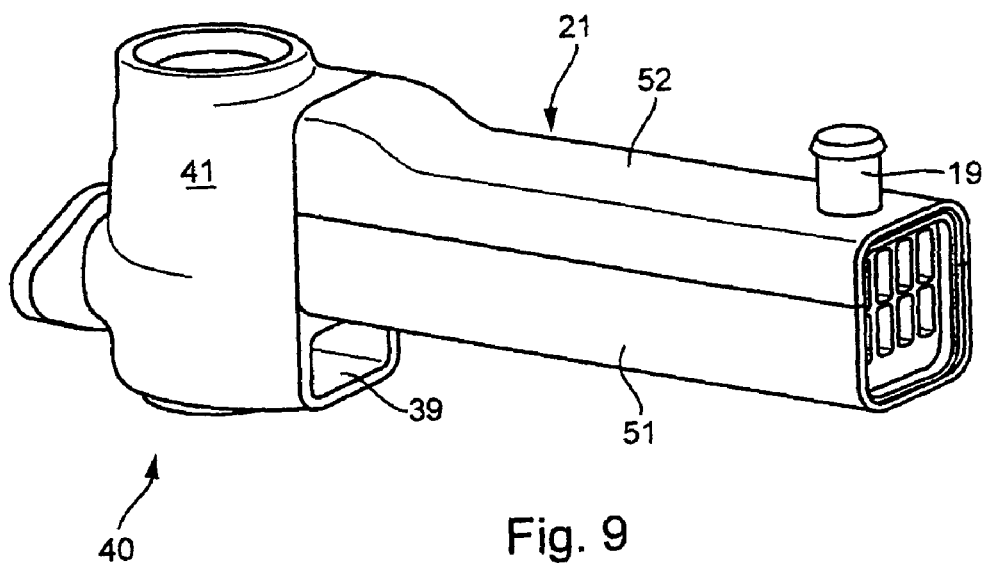

Then, in accordance with step 2 shown in FIG. 8, the lower shell 51 of the heat exchanger 21 is attached to the valve housing. In accordance with step 3, FIG. 9, of the process, the top shell 52 with the water connection piece 19 is attached. The top shell 52 and the lower shell 51 close off the water passages 24, through which the cooling liquid flows, of the heat exchanger 21 with respect to the outside. They are connected in a fluid-tight manner to one another and to the end frames bearing the exhaust gas lead-through tubes 50. The metal diverter plate is located on the inside of the top shell 52. The opening in the valve housing 41 to the water chamber 72 is surrounded by the top shell 52, so that the coolant flows out of the heat exchanger 21 into the water chamber 72. The top shell 52 and bottom shell 51 are welded to the valve housing 41 in a fluid-tight manner and form a part of the housing 15.

Figure 10:
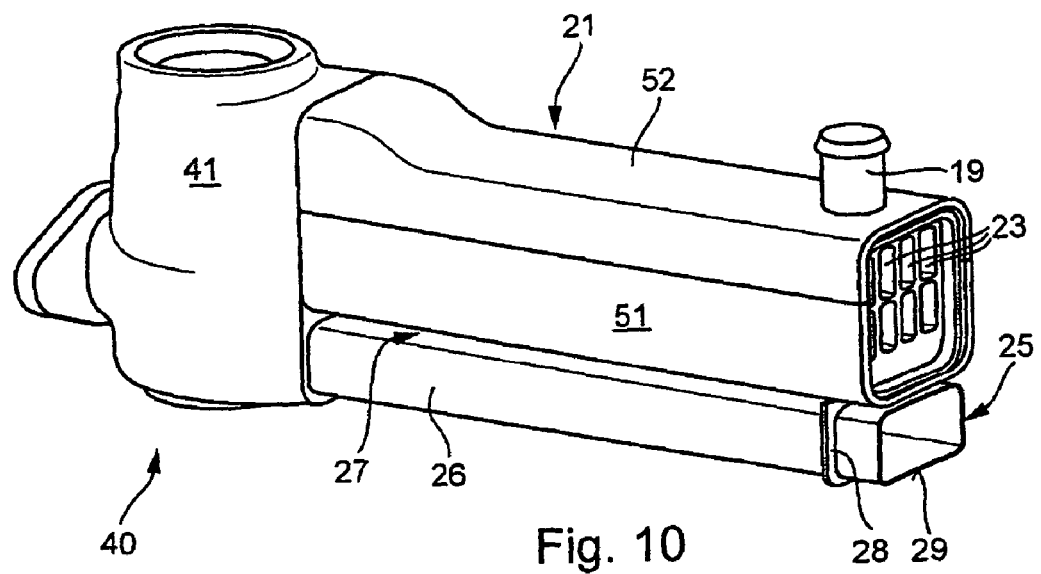

In accordance with step 4 of the process, shown in FIG. 10, the inner tube 26, which forms the second exhaust gas passage 25, is then welded to the valve housing around the opening of the second exhaust gas passage. The inner tube is supported on the bottom shell 51 by means of the supporting frame 28 attached to the inner tube 26, so that the air gap 27 is formed between them.

Figure 11:
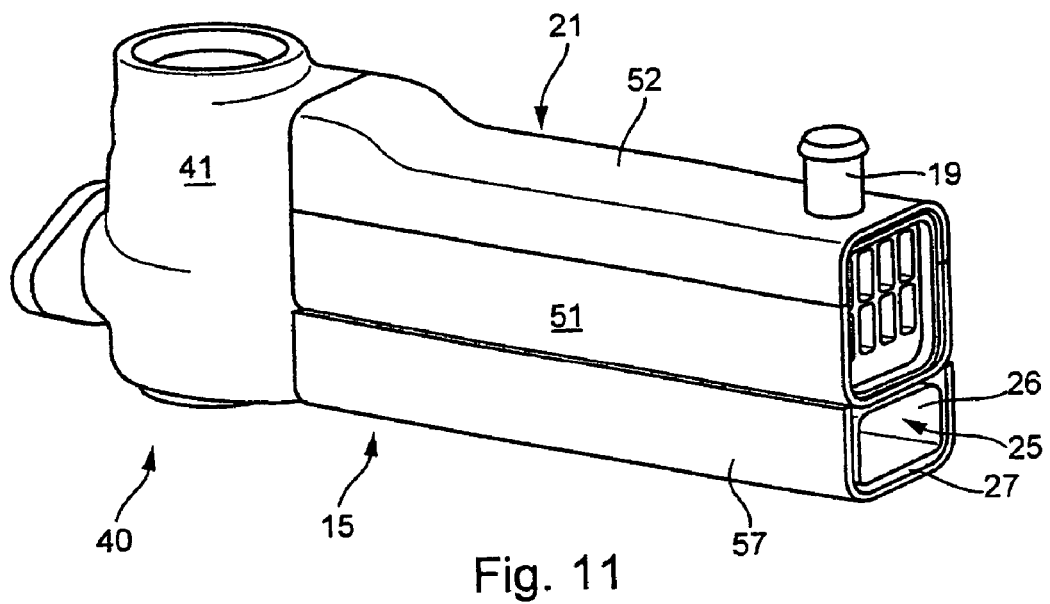

Then, in accordance with step 5 of the process, shown in FIG. 11, the outer wall 57 is fitted and connected to the valve housing 41 and also in the upper region to the bottom shell 51. The outer wall 57 surrounds the inner tube 26 and ends laterally with respect to the bottom shell 41 of the exhaust gas heat exchanger. The inner tube 26 is supported on the outer wall 57 by means of the supporting frame both laterally and on the underside, so that an air gap 27, which insulates the inner tube from its surroundings, is formed on all sides.

Figure 12:
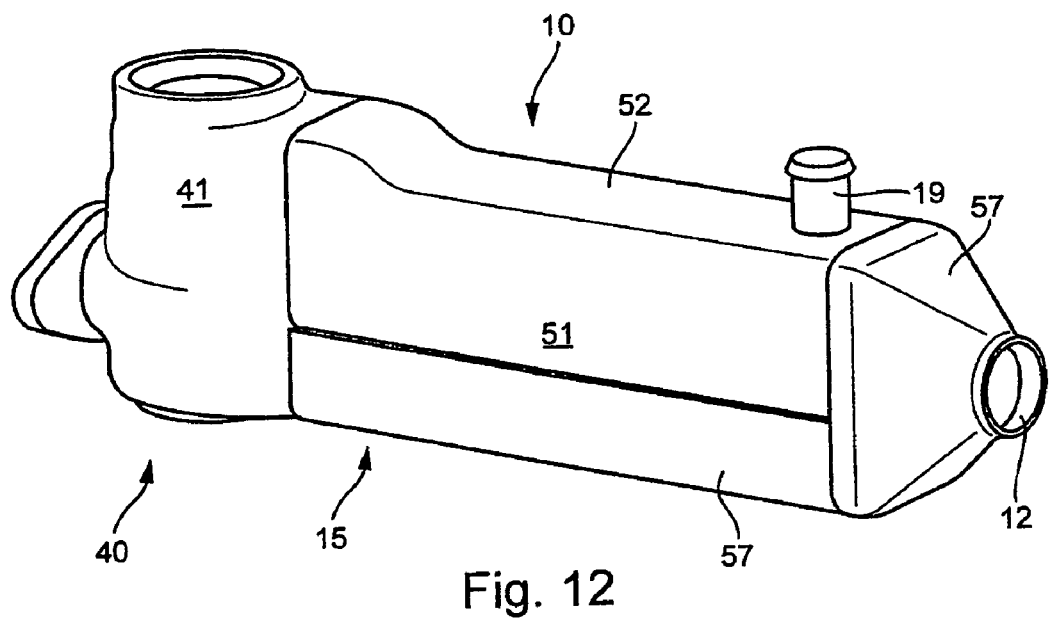

In accordance with step 6 of the process, FIG. 12, the axial wall termination 57 with the exhaust gas discharge 12 is then connected in a fluid-tight manner at the front end of outer wall 57, bottom shell 51 and top shell 52, so that the housing 15 of the exhaust gas heat exchanger 10 is completed. The exhaust gas collector space 16, from which the exhaust gas stream leaves the switchable exhaust gas heat exchanger 10, which is now complete apart from the valve being inserted in the valve housing, through the exhaust gas discharge 12, is formed in the wall termination 57.

The switchable exhaust gas heat exchanger is completed by the corresponding valve insert being inserted. It can be seen from the process illustrated that the heat exchanger can be assembled from a small number of simple components which can be fitted together quickly. All the connections can be formed as welded joints, and consequently there is little need for seals. A robust structure with long-term durability is produced, and consequently this structure also has a long service life even with respect to the thermal loads which occur.

The invention claimed is:

1. A switchable exhaust gas heat exchanger comprising:
    an exhaust gas feed line and an exhaust gas discharge for an exhaust gas stream,
    a first and a second exhaust gas passage leading to the exhaust gas discharge,
    a switching valve configured to switch the exhaust gas stream between the exhaust gas passages, and
    a heat exchanger through which a coolant flows which is arranged in the first exhaust gas passage, wherein the second exhaust gas passage routes the exhaust gas stream past the heat exchanger to the exhaust gas discharge,
    wherein the switching valve is configured to be switched as a function of a temperature of the coolant,
    wherein the switching valve includes a water chamber that the coolant flows through.

2. The switchable exhaust gas heat exchanger as claimed in claim 1, wherein the heat exchanger is arranged so that the coolant flows around a thermostat, wherein the switching valve is switched by the thermostat, wherein the thermostat exerts an axial displacement as a function of temperature.

3. The switchable exhaust gas heat exchanger as claimed in claim 2, wherein the switching by the thermostat takes place counter to an action of a restoring spring.

4. The switchable exhaust gas heat exchanger as claimed in claim 2, wherein the thermostat is arranged downstream of the heat exchanger in a circuit of the coolant.

5. The switchable exhaust gas heat exchanger as claimed in claim 4, characterized in that wherein the thermostat is arranged coaxially with respect to the valve stem of the switching valve.

6. The switchable exhaust gas heat exchanger as claimed in claim 2, wherein the thermostat is arranged directly on a valve housing of the switching valve.

7. The switchable exhaust gas heat exchanger as claimed in claim 6, wherein the thermostat is arranged in a cap that closes off the valve housing, wherein the cap has an outlet opening for the coolant.

8. The switchable exhaust gas heat exchanger as claimed in claim 7, wherein the cap is arranged rotatably on the valve housing so that a direction of the outlet opening can be oriented in a direction of rotation, wherein the cap is sealed with respect to the valve housing.

9. The switchable exhaust gas heat exchanger as claimed in claim 8, wherein the cap is attached to the valve housing such that the cap is secured by means of a circlip.

10. The switchable exhaust gas heat exchanger as claimed in claim 2, wherein the thermostat includes a thermostat adjuster that switches the switching valve.

11. The switchable exhaust gas heat exchanger as claimed in claim 2, wherein the displacement lies in a range from 8 to 16 mm.

12. The switchable exhaust gas heat exchanger as claimed in claim 1, wherein the switching valve has a valve chamber region, through which the exhaust gas stream flows, and a valve head region which is fluid-separated from the valve chamber region, wherein the coolant flows through the valve head region.

13. The switchable exhaust gas heat exchanger as claimed in claim 12, wherein a seal is arranged between valve housing and valve stem to fluidly separate the valve chamber region and a valve head in the valve housing.

14. The switchable exhaust gas heat exchanger as claimed in claim 13, wherein the seal is arranged in an annular groove formed in the valve housing.

15. The switchable exhaust gas heat exchanger as claimed in claim 1, wherein the switching valve has a disk valve arranged in a valve housing with a valve disk and a valve stem protruding from the valve disk wherein the thermostat acts directly on the valve stem.

16. The switchable exhaust gas heat exchanger as claimed in claim 15, wherein at least the valve disk of the disk valve has a catalytic coating.

17. The switchable exhaust gas heat exchanger as claimed in claim 15, wherein the valve disk has machined edges.

18. The switchable exhaust gas heat exchanger as claimed in claim 15, wherein the valve disk has ground edges.

19. The switchable exhaust gas heat exchanger as claimed in claim 1, wherein the switching valve is a rocker valve in which one of the two exhaust gas passages or the other, as an alternative, has the exhaust gas stream flowing through it, wherein the switching occurs at a predetermined switching threshold.

20. The switchable exhaust gas heat exchanger as claimed in claim 19, wherein the switching threshold is set between a cold-start temperature and an operating temperature of an internal combustion engine, at which exhaust gases from the internal combustion engine are able to flow through the exhaust gas heat exchanger.

21. The switchable exhaust gas heat exchanger as claimed in claim 1, wherein the switching valve is a proportional control valve, wherein the exhaust gas stream flows through one of the two exhaust gas passages while the heat exchanger is operating below a switching threshold of the switching valve and flows through the other of the two exhaust gas passages while the heat exchanger is operating above a switching limit, wherein proportional amounts of the exhaust gas stream flows through both exhaust gas passages between the switching threshold and the switching limit.

22. The switchable exhaust gas heat exchanger as claimed in claim 21, wherein the switching limit is approximately 10° C. above the switching threshold.

23. The switchable exhaust gas heat exchanger as claimed in claim 1, wherein the first exhaust gas passage and the second exhaust gas passage are arranged in a common housing and are separated from one another by an air gap.

24. The switchable exhaust gas heat exchanger as claimed in claim 23, wherein the second exhaust gas passage comprises an inner tube which is secured directly to a valve housing of the switching valve on just one side, wherein the second end of the inner tube protrudes freely toward the exhaust gas discharge.

25. The switchable exhaust gas heat exchanger as claimed in claim 24, wherein the inner tube is supported with respect to the housing and with respect to the first exhaust gas passage via at least one outer supporting element.

26. The switchable exhaust gas heat exchanger as claimed in claim 25, wherein the at least one outer supporting element is at least one encircling supporting frame.

27. The switchable exhaust gas heat exchanger as claimed in claim 25, wherein the at least one supporting element is attached on just one side, over part of a bearing contact between the supporting element and an attachment location.

28. The switchable exhaust gas heat exchanger as claimed in claim 27, wherein the at least one supporting element is attached to the inner tube and is axially displaceable with respect to the housing and/or with respect to the first exhaust gas passage.

29. The switchable exhaust gas heat exchanger as claimed in claim 27, wherein the supporting element is attached non-releasably over the part of the bearing contact.

30. The switchable exhaust gas heat exchanger as claimed in claim 1, wherein the first and second exhaust gas passages are of equal lengths and open into a common exhaust gas collector space which leads to the exhaust gas discharge.

31. The switchable exhaust gas heat exchanger as claimed in claim 1, wherein at least a proportion of the exhaust gas passages has a rectangular cross section.

32. The switchable exhaust gas heat exchanger as claimed in claim 1, wherein a housing which surrounds the first and second exhaust gas passages is arranged on the valve housing of the switching valve, wherein the housing accommodates the two exhaust gas passages and delimits an exhaust gas collector space leading to the exhaust gas discharge.

33. The switchable exhaust gas heat exchanger as claimed in claim 1, wherein the components of the heat exchanger in contact with the exhaust gas stream are made from metallic materials.

34. The switchable exhaust gas heat exchanger as claimed in claim 1, wherein the valve housing has three chambers formed next to one another, wherein each of the chambers has a connection opening leading out of the valve housing, a middle chamber separated from two outer chambers by, in each case, a partition, wherein each of the partitions has a through-flow opening, wherein through-flow openings are configured to be closed off by the switching valve, wherein the connection opening of the middle chamber is fluid-connected to the exhaust gas feed line and each of the two outer chambers is fluid-connected to, in each case, one exhaust gas passage.

35. The switchable exhaust gas heat exchanger as claimed in claim 1, wherein the heat exchanger is arranged in a cooling circuit of a internal combustion engine downstream of the internal combustion engine.

36. The switchable exhaust gas heat exchanger as claimed in claim 1, wherein the coolant of the heat exchanger is an engine coolant.

37. The switchable exhaust gas heat exchanger as claimed in claim 1, further comprising a thermostat that is configured to switch the switching valve, wherein the thermostat is in contact with the coolant flowing through the water chamber.

* * * * *